(12) United States Patent
Griffiths et al.

(10) Patent No.: US 6,584,778 B1
(45) Date of Patent: Jul. 1, 2003

(54) METHODS AND APPARATUS FOR SUPPLYING COOLING AIR TO TURBINE ENGINES

(75) Inventors: James Alan Griffiths, West Chester, OH (US); Mitchell Donald Smith, Morrow, OH (US); James William Bartos, Wilmington, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/567,240

(22) Filed: May 11, 2000

(51) Int. Cl.[7] .............. F02C 7/12; F02C 7/16; F02C 7/224

(52) U.S. Cl. .............. 60/782; 60/730; 60/736; 60/806; 60/226.1

(58) Field of Search ............... 60/226.1, 730, 60/736, 39.07, 39.75, 39.83, 782, 785, 805, 806

(56) References Cited

U.S. PATENT DOCUMENTS

| | | | | |
|---|---|---|---|---|
| 2,979,293 A | * | 4/1961 | Mount | 60/736 |
| 3,000,176 A | * | 9/1961 | Kuhrt | 60/736 |
| 3,038,308 A | * | 6/1962 | Fuller | 60/736 |
| 4,187,675 A | * | 2/1980 | Wakeman | 60/39.75 |
| 4,773,212 A | * | 9/1988 | Griffin et al. | 60/226.1 |
| 4,782,658 A | * | 11/1988 | Perry | 60/226.1 |
| 4,991,394 A | * | 2/1991 | Wright | 60/39.07 |
| 5,267,608 A | * | 12/1993 | Coffinberry | 165/70 |
| 5,782,076 A | * | 7/1998 | Huber et al. | 60/736 |
| 6,050,080 A | | 4/2000 | Horner | |
| 6,065,282 A | | 5/2000 | Fukue et al. | |
| 6,253,554 B1 | | 7/2001 | Kobayashi et al. | |
| 6,295,803 B1 | | 10/2001 | Bancalari | |

FOREIGN PATENT DOCUMENTS

GB 2072268 * 9/1981 .................. 60/736

* cited by examiner

*Primary Examiner*—Ted Kim
(74) *Attorney, Agent, or Firm*—Rodney M. Young; Armstrong Teasdale LLP (57) ABSTRACT

A cooling air cooling system is selectively operable to reduce fuel gum deposits within the cooling system during gas turbine engine operations. The cooling system includes a recirculating loop that includes at least three heat exchangers in fluid communication with the recirculating loop. A first heat exchanger cools cooling air supplied to the gas turbine engine. A second heat exchanger cools fluid exiting the first of the heat exchangers with fan discharge air prior to the fluid entering the third heat exchanger. A third heat exchanger uses combustor main fuel flow to cool the fluid circulating in the recirculating loop.

20 Claims, 4 Drawing Sheets

METHODS AND APPARATUS FOR SUPPLYING COOLING AIR TO TURBINE ENGINES

GOVERNMENT RIGHTS STATEMENT

The United States Government has rights in this invention pursuant to Contract No. N00019-96-C-0176.

BACKGROUND OF THE INVENTION

This invention relates generally to turbine engines, and more particularly, to cooling systems for turbine engines.

A gas turbine engine typically includes a multi-stage axial compressor, a combustor, and a turbine. Airflow entering the compressor is compressed and directed to the combustor where it is mixed with fuel and ignited, producing hot combustion gases used to drive the turbine. As a result of the hot combustion gases entering the turbine, typically compressor air is channeled through a turbine cooling circuit and used to cool the turbine.

Compressor bleed air is often used as a source of cooling air for the turbine cooling circuit. However, extracting cooling air from the compressor may affect overall gas turbine engine performance. To minimize a reduction in engine performance, the cooling system may use fuel flowing through a heat exchanger to absorb heat from the compressor bleed air. As the fuel absorbs heat from the compressor bleed air, the temperature of the bleed air is lowered and engine cooling airflow requirements are reduced, thus reducing engine performance losses.

However, when fuel is heated, often carbon, gum, and coke deposits form within tubing used to transport fuel through the heat exchanger. Over time, such deposit agglomeration blocks individual tube passages resulting in higher fuel pressure losses in the heat exchanger and impaired heat transfer performance. Impaired heat transfer performance may result in less heat being absorbed from compressor bleed air and turbine components receiving compressor bleed air being cooled less effectively. As a result, such components are subjected to increased low cycle fatigue, LCF, stresses and increased thermal stresses. Furthermore, because turbine components are cooled less effectively, overall engine life is decreased.

BRIEF SUMMARY OF THE INVENTION

In an exemplary embodiment, during gas turbine engine operations, a cooling system reduces fuel gum deposits within the cooling system and provides cooling air to the gas turbine engine. The cooling system includes a recirculating loop including a plurality of heat exchangers in fluid communication with the recirculating loop. A first heat exchanger is an air-fluid heat exchanger that uses heat transfer fluid to cool cooling air used by the gas turbine engine. A second heat exchanger is an air-fluid heat exchanger that uses engine fan air to cool the heat transfer fluid circulating in the recirculating loop. A third of the heat exchangers is a fluid-fuel heat exchanger that uses combustor main fuel flow as a heat sink to cool the heat transfer fluid circulating in the recirculating loop. The cooling system is selectively operable to reduce fuel gum deposits and provide cooling air to the gas turbine engine when the gas turbine engine is operating. A flow of heat transfer fluid through the third heat exchanger is modulated by a bypass line and valve to control the heat transfer from the heat transfer fluid to the fuel flow to reduce fuel gum deposits.

During gas turbine engine operations, the cooling system may be operated using either fuel flow or fan discharge airflow as a heat sink with all three heat exchangers in operation. Alternatively, the cooling system may be operated using fan discharge airflow as a heat sink with the third heat exchanger bypassed. Fuel is used as a heat sink when sufficient deposit dissipation forces are prevalent within the third heat exchanger or when a maximum temperature of the fuel can be controlled such that the temperature remains below temperatures conducive to fuel gum deposit formation. Fuel passing through the third heat exchanger flows through a path that increases heat transfer from the heat transfer fluid to the fuel. As a result of the flow through the fuel paths, the fuel flow develops high fluid turbulent forces and fluid shear forces that reduce fuel deposits within the third heat exchanger.

DETAILED DESCRIPTION OF THE INVENTION

Figure 1:
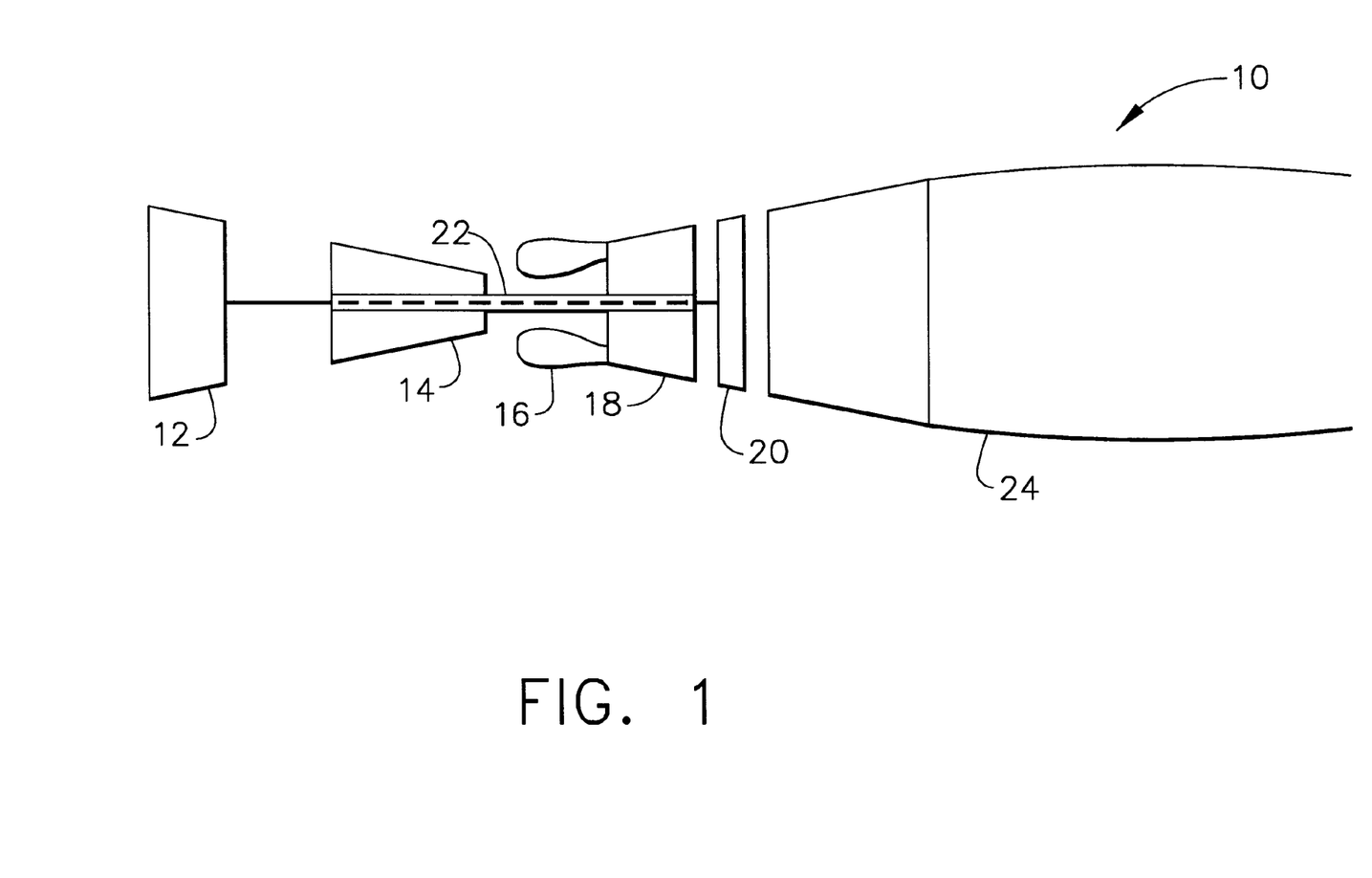
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. compressor 12 and turbine 20 are coupled by a first shaft 21, and compressor 14 and turbine 18 are coupled by a second shaft 22. In one embodiment, gas turbine engine 10 is an F110 engine commercially available from General Electric Aircraft Engines, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
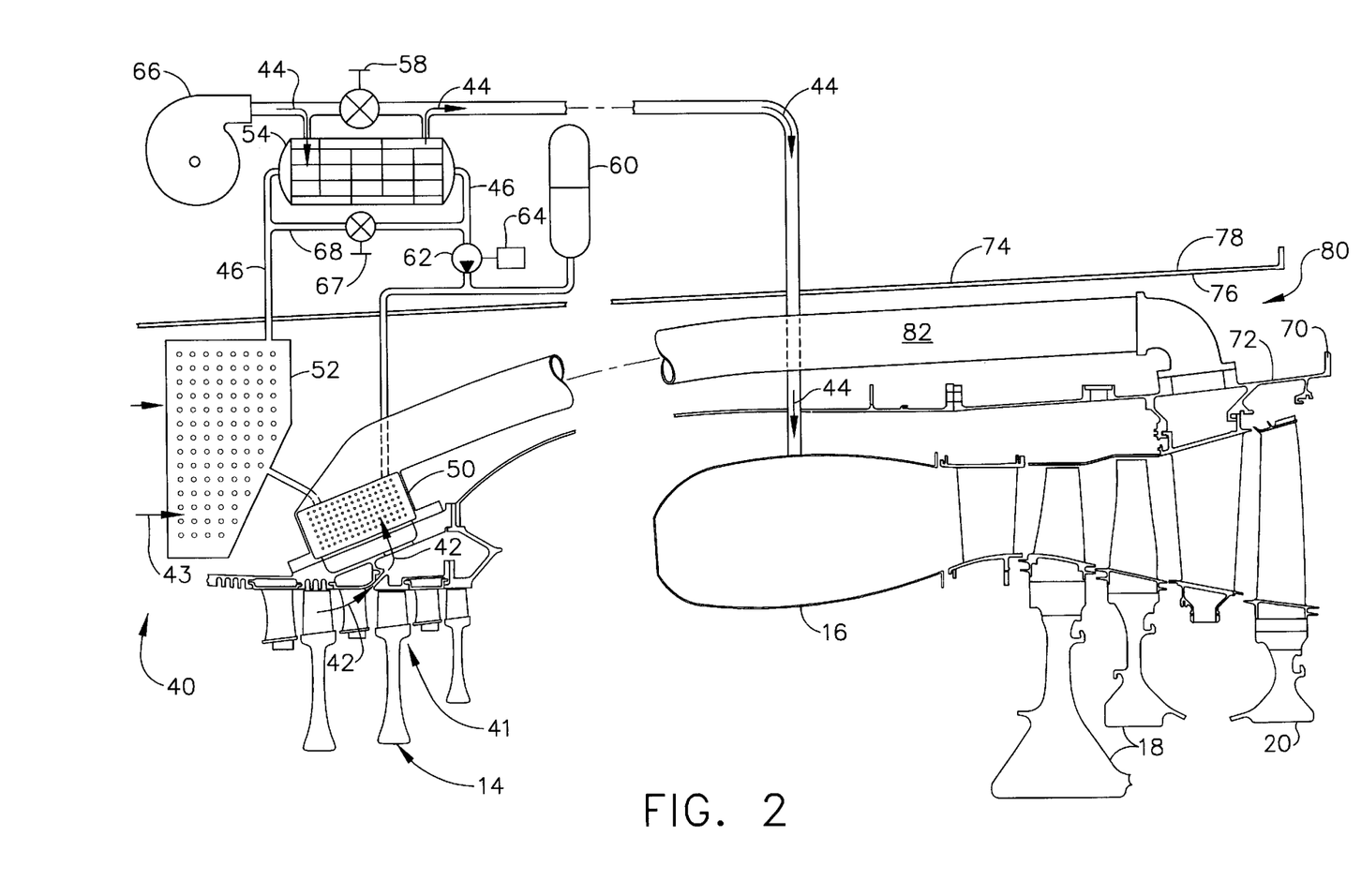
FIG. 2 is schematic illustration of a cooling system used with the gas turbine engine shown in FIG. 1.

FIG. 2 is a schematic illustration of a cooling system 40 used with gas turbine engine 10. Cooling system 40 is an indirect cooling system (ICS) that is selectively operable. Compressor bleed air 42 is extracted by cooling system 40 from high pressure compressor 14 from intermediate stages 41 of compressor 14. Alternatively, compressor bleed air 42 is extracted by cooling system 40 from a high-pressure compressor discharge (not shown) of compressor 14. System 40 uses fan discharge air 43 and combustor fuel flow 44 as heat sinks to provide heated fuel flow to combustor 16 and cooled interstage compressor bleed air 42 to cool low pressure turbine 20 and associated turbine components (not shown). In another embodiment, cooling system 40 supplies compressor discharge bleed air 42 to cool high pressure turbine 18 and associated turbine components (not shown).

Recirculating loop 46 is a closed loop and includes a first heat exchanger 50, a second heat exchanger 52, and a third heat exchanger 54. Because recirculating loop 46 is a closed loop, no make-up water is used. First heat exchanger 50 is an air-fluid heat exchanger and transfers heat from compressor bleed air 42 to a suitable heat transfer fluid circulated in recirculating loop 46. In one embodiment, the heat transfer fluid is a water and methanol mix wherein the water is pure de-ionized laboratory grade water and the methanol prevents the heat transfer fluid from freezing when gas turbine engine 10 is inoperative and when the heat transfer fluid is not circulating. Buffer compounds are added to recirculating loop 46 to adjust the water chemistry and prevent corrosion within recirculating loop 46. In another embodiment, recirculating loop 46 is coated with a metal oxide chemical vapor deposition coating to prevent corrosion.

Fluid exiting first heat exchanger 50 is routed directly to second heat exchanger 52. The general term "fluid", as used herein, refers to a two phase liquid-vapor system that occurs when a temperature exceeds a saturation temperature for the system pressure, a single phase supercritical fluid where fluid pressure exceeds a critical pressure for the heat transfer fluid and no phase change exists, or a liquid below a saturation temperature at a specified pressure in all or part of recirculating loop 46. Second heat exchanger 52 is an air-fluid heat exchanger that transfers heat from the heat transfer fluid to gas turbine engine fan discharge air 43. Gas turbine engine fan discharge air 43 flows through second heat exchanger 52 and extracts heat from the heat transfer fluid generated as a result of the heat transfer fluid extracting heat from compressor bleed air 42 in first heat exchanger 50. Because second heat exchanger 52 transfers heat from heat transfer fluid to fan discharge air 43, a potential amount of heat that may be transferred to main combustor fuel flow 44 from the heat transfer fluid circulating is reduced. Furthermore, because the formation of fuel deposits is more prevalent at higher temperatures, reducing the temperature of the heat transfer fluid within third heat exchanger 54 also reduces the formation of fuel deposits.

Fluid exiting second heat exchanger 52 is routed to third heat exchanger 54. Third heat exchanger 54 is a fluid-fuel heat exchanger that transfers heat from the heat transfer fluid to main combustor fuel flow 44 supplied to combustor 16. Main combustor fuel flow 44 is the heat sink used within third heat exchanger 54 that extracts remaining heat added to the heat transfer fluid, i.e. from first heat exchanger 50, that was not transferred to fan discharge air 43 by second heat exchanger 52. Thus, third heat exchanger 54 establishes an overall heat balance within recirculating loop 46. Third heat exchanger 54 includes a first passageway (not shown) and a second passageway (not shown). The first passageway includes a plurality of tubes (not shown) that permit heat transfer fluid to flow from second heat exchanger 52 through third heat exchanger 54. The second passageway permits main combustor fuel flow 44 to flow through third heat exchanger 54 and around the first passageway plurality of fluid tubes transporting heat transfer fluid. In one embodiment, a control valve 58 is used to vary an amount of fuel flow 44 entering the third heat exchanger second passageway. A total amount of fuel flow passing through third heat exchanger 54 and control valve 58 equals a total fuel flow 44 supplied to combustor 16.

Steam exiting second heat exchanger 52 is routed to third heat exchanger 54. Third heat exchanger 54 is a steam-fuel heat exchanger that transfers heat from the heat transfer fluid to main combustor fuel flow 44 supplied to combustor 16. Main combustor fuel flow 44 is the heat sink used within third heat exchanger 54 that extracts remaining heat added to the heat transfer fluid, i.e. from first heat exchanger 50, that was not transferred to fan discharge air 43 by second heat exchanger 52. Thus, third heat exchanger 54 establishes an overall heat balance within recirculating loop 46. Third heat exchanger 54 includes a first passageway (not shown) and a second passageway (not shown). The first passageway includes a plurality of tubes (not shown) that permit heat transfer fluid to flow from second heat exchanger 52 through third heat exchanger 54. The second passageway permits main combustor fuel flow 44 to flow through third heat exchanger 54 and around the first passageway plurality of fluid tubes transporting heat transfer fluid. In one embodiment, a control valve 58 is used to vary an amount of fuel flow 44 entering the third heat exchanger second passageway. A total amount of fuel flow passing through third heat exchanger 54 and control valve 58 equals a total fuel flow 44 supplied to combustor 16.

The first passage plurality of tubes are closely-spaced and define a plurality of fuel passes extending through the second passageway. As main combustor fuel flow 44 flows around the tubes through the fuel passages, the closely-spaced passageways cause fluid turbulent forces and fluid shear forces to develop. Furthermore, as a result of fluid turbulent forces and fluid shear forces, a Reynolds number for the heat transfer fluid increases. The increased Reynolds number and the fluid turbulent and shear forces permit the fluid to mitigate any deposit fragments formed on outside surfaces (not shown) of the tubes and separate the deposits from the tubes. The loosened deposits are mixed with main combustor fuel flow 44 and burned in combustor 16. Accordingly, deposit agglomeration and blockage within the tubes is reduced.

Recirculating loop 46 also includes an accumulator 60 and a pump 62. In one embodiment, accumulator 60 may be a gaseous-nitrogen charged accumulator that maintains system pressure of recirculating loop 46. In another embodiment, recirculating loop 46 includes a mechanical device (not shown), such as a spring, within accumulator 60 in lieu of gaseous-nitrogen to maintain system pressure of recirculating loop 46. Accumulator 60 derives thermal energy from recirculating loop 46 as described in more detail below. Pump 62 is a variable-speed recirculation pump that may adjust system pressure within recirculating loop 46. Pump 62 is coupled to a motor 64. In one embodiment, motor 64 is an electric motor. In another embodiment, motor 64 and pump 62 are driven by fuel flow 44 in lieu of electric motor 64 and pump 62, and fuel flow pressure is provided by a main fuel pump 66 disposed within gas turbine engine 10.

Cooling system 40 is coupled to a cooling system electronic control (not shown) that is electrically coupled to an engine control system (not shown). In one embodiment, the engine control system is known as a full authority digital electronic control (FADEC) available from Lockheed Martin Control Systems, Johnson City, N.Y. The cooling system electronic control regulates energization of pump 62 and also regulates operation of a bypass valve 67 that controls a flow of heat transfer fluid flow through a bypass 68, as well as control valve 58 which controls a bypass of fuel flow 44 around third heat exchanger 54. Bypass 68 permits a portion or all of heat transfer fluid flowing in recirculating loop 46 to bypass third heat exchanger 54 when desirable to limit fuel exit temperatures exiting third heat exchanger 54. Thus, the cooling system electronic control regulates the pressure and cooling capacity of recirculating loop 46 with bypass 68. When third heat exchanger 54 is bypassed, second heat exchanger 52 still provides significant heat transfer for the heat transfer fluid.

Gas turbine engine 10 includes an engine core casing 70 having an external surface 72 and a fan bypass casing 74 having an internal surface 76 and an external surface 78. Engine core casing 70 extends circumferentially around gas turbine engine 10 and extends from compressor 14, combustor 16, and turbines 18 and 20. Fan bypass casing 74 extends circumferentially around engine core casing 70 and defines a cavity 80 between core casing 70 and fan bypass casing 74. Engine fan discharge flow 43 is directed through cavity 80 to exhaust nozzle 24. First heat exchanger 50 is mounted to engine core casing external surface 72 and extends into cavity 80 to attach to a plurality of cooling air tubes 82 disposed within cavity 80. Accordingly, first heat exchanger 50 does not include any air ducts for routing air to first heat exchanger. Engine performance is not adversely affected by first heat exchanger 50 because a pressure drop of the cooling air passing through first heat exchanger 50 is relatively low. Second heat exchanger 52 is mounted to fan bypass casing internal surface 76 and extends across cavity 80 to enable engine fan discharge flow 43 to pass through second heat exchanger 52. Third heat exchanger 54 is mounted to fan bypass casing external surface 78.

Because separate heat exchangers 52 and 54 are used for air and fuel, third heat exchanger 54 is optimized for a high deposit dissipation rate and second heat exchanger 52 is optimized for low cooling air pressure drop while providing significant heat sink capacity to system 40 when third heat exchanger 54 is not in operation. Specifically, third heat exchanger 54 is optimized to develop increased fuel Reynolds numbers to increase fuel shear stresses for main combustor fuel flow 44. During engine high fuel flow operations, the fuel shear stresses mitigate gum deposits attached to the outside of the third heat exchanger tubes.

During start-up and low power operations of gas turbine engine 10, when sufficient fuel deposit dissipation forces would not be present for fuel flow 44 supplied to combustor 16 in accordance with a fuel schedule (not shown), cooling system 40 may be operated using second heat exchanger 52 and fan discharge airflow 43 as the heat sink. During such operating conditions, heat transfer fluid within recirculating loop 46 is circulated and bypassed around third heat exchanger 54 using bypass valve 67 and bypass 68 to prevent fuel gum deposit formation within third heat exchanger 54. Depending on inlet temperatures of main combustor fuel flow 44 entering third heat exchanger 54, bypass 68 can be modulated using bypass valve 67 to prevent an exit temperature of fuel flow 44 from increasing to a temperature conducive to fuel gum deposit formation, while still providing heat sink capacity. Thus, the operation of heat exchangers 52 and 54 may be varied to optimize the cooling of compressor bleed air 42 while preventing the formation of fuel gum deposits in third heat exchanger 54.

Initially accumulator 60 is charged to a relatively low pressure. In one embodiment, accumulator 60 is initially charged to approximately 275 psia. When cooling system 40 is placed in operation, heat transfer fluid within first heat exchanger 50 initially boils. As the heat transfer fluid boils, accumulator 60 increases in pressure. Accumulator 60 uses additional changes in heat transfer fluid density to pressurize and is thus, self-pressurizing. Eventually, recirculating loop pressures exceed supercritical pressures for the heat transfer fluid, thus maintaining single phase fluid in recirculating loop 46 during steady-state operations. During start-up operations, pump 62 maintains recirculating loop pressure and fluid flow.

During operation of cooling system 40, heat transfer fluid circulating in recirculating loop 46 is circulated at a regulated pressure. The regulated flow of heat transfer fluid ensures adequate heat transfer occurs within first, second, and third heat exchangers 50, 52, and 54, respectively. Specifically, the combination of the regulated heat transfer fluid flow, the use of fluid bypass 68 to control exit fuel temperatures, and the fluid forces generated within third heat exchanger 54 during high fuel flow operations, reduces fuel gum deposits within third heat exchanger 54 when gas turbine engine 10 is operating over a wide range of operating power levels. Furthermore, as a result of fluid turbulent forces and fluid shear forces developed at high fuel flow rates, deposit fragments formed on outside surfaces (not shown) of the tubes in third heat exchanger 54 are easily separated from the tube surfaces and mixed with main combustor fuel flow 44. In another embodiment, a fuel filter (not shown) disposed downstream from third heat exchanger 54 may be used to filter such deposits to prevent such deposits from entering fuel nozzles (not shown).

When engine 10 returns to low power operations after an extended period of high power operations, cooling system 40 remains in operation and the heat transfer fluid is bypassed through bypass 68 around third heat exchanger 54. Compressor bleed air 42 is then cooled with fan discharge air 43 passing through second heat exchanger 52. Main combustor fuel flow 44 continues to flow through and cool third heat exchanger 54. Accordingly, hot soak-back problems are minimized.

The pressure of recirculating loop 46 is regulated such that if a leak of the heat transfer fluid occurs within recirculating loop 46 of cooling system 40, only a limited amount of heat transfer fluid escapes before the system pressure drops to a level where leakage can no longer occur. When the engine control senses a loss in recirculating loop pressure, the engine control may provide a throttle limit to enable engine 10 to operate in a power regime where pre-cooling of turbine cooling air is not required. Furthermore, fire hazards associated with recirculating loop 46 are reduced because the mixture of methanol and water is not combustible under ordinary engine operating conditions and because third heat exchanger 54 is mounted externally to engine casing 74. As a result, if a fuel leak develops, fuel is not introduced into engine 10, but rather remains external to engine 10.

Figure 3:
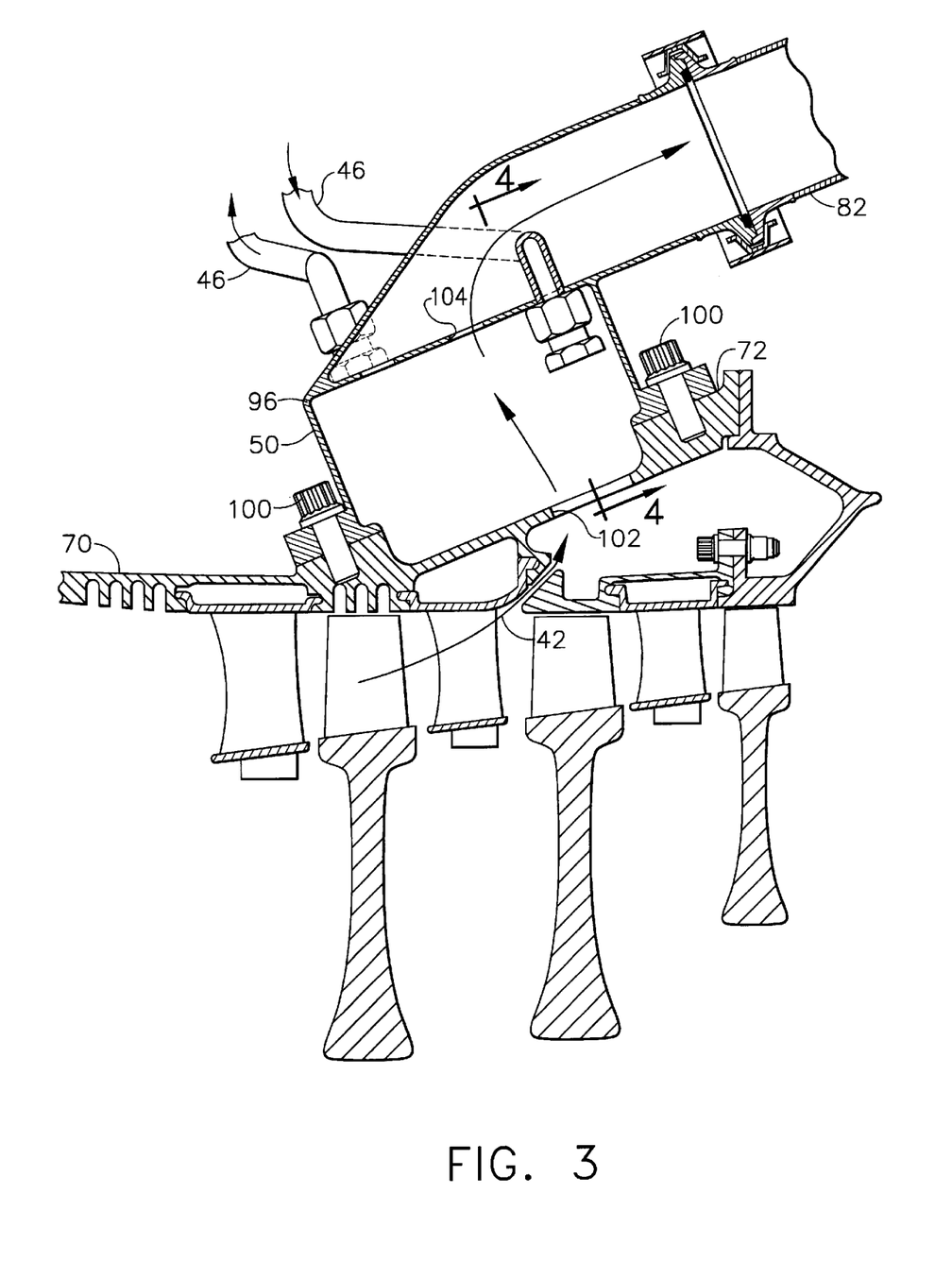
FIG. 3 is a side cross-sectional view of a heat exchanger used with the cooling system shown in FIG. 2.
Figure 4:
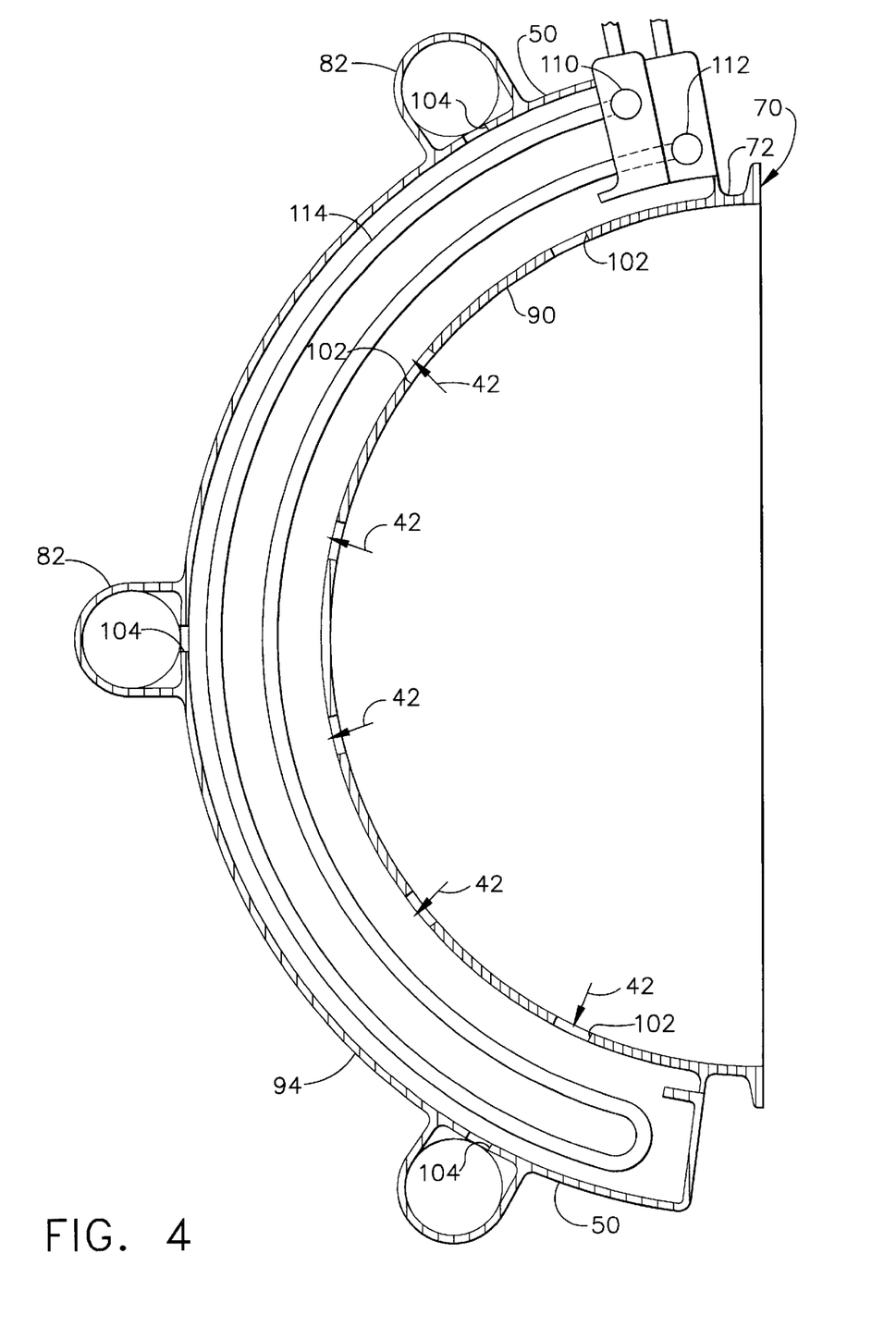
FIG. 4 is a partial cross-sectional view of the heat exchanger shown in FIG. 3 taken along line 4—4.

FIG. 3 is a side cross-sectional view of first heat exchanger 50 mounted to engine 10. FIG. 4 is a partial cross-sectional view of first heat exchanger 50 taken along line 4—4 shown in FIG. 3. Engine core casing 70 is fabricated from a first portion 90 and a substantially similar second portion (not shown) joined together with a splitline flange (not shown) such that core casing 70 extends circumferentially. First heat exchanger 50 is mounted to engine core casing external surface 72 and includes a first portion 94 and an identical second portion (not shown). The heat exchanger second portion and first portion are constructed identically and when connected together, first heat exchanger 50 extends circumferentially around engine core casing 70.

First heat exchanger 50 includes an outer heat exchanger cover 96 disposed circumferentially around engine core casing 70. Outer heat exchanger cover 96 is attached to engine core casing 70 with a plurality of fasteners 100. A seal (not shown) is disposed between outer heat exchanger cover 96 and core casing external surface 72 and minimizes leakage of cooling air 42 flowing through first heat exchanger 50. First heat exchanger 50 is in flow communication with a plurality of first openings 102 and a plurality of second openings 104. First openings 102 are disposed circumferentially around engine core casing 70 to permit bleed air 42 to enter first heat exchanger 50. Second openings 104 are disposed circumferentially around outer heat exchanger cover 96 to permit bleed air 42 to exit first heat exchanger 50 and enter cooling air tubes 82 and be directed to turbine 20 (shown in FIGS. 1 and 2).

First heat exchanger 50 also includes a first manifold 110 disposed at one splitline and a second manifold 112 disposed at the same splitline. A plurality of tubing 114 extends between first manifold 110 and second manifold 112 in a two-pass crossflow pattern (not shown).

During operation of cooling system 40, heat transfer fluid enters first heat exchanger 50 through first manifold 110, passes through tubing 114, and exits first heat exchanger 50 through second manifold 112.

The above-described cooling system is cost-effective and highly reliable. The cooling system is selectively operable when the gas turbine engine is operating to reduce fuel gum deposits within the cooling system and provide cooling air to the gas turbine engine. Although combustor main fuel flow is used as a heat sink, the cooling system prevents deleterious high temperature fuel deposits from forming within the heat exchanger.

While the invention has been described in terms of various specific embodiments, those skilled in the art will recognize that the invention can be practiced with modification within the spirit and scope of the claims.

What is claimed is:

1. A method for supplying cooling air to a gas turbine engine including a casing using a cooling system in flow communication with the gas turbine engine, the cooling system including a recirculating loop including at least three heat exchangers in fluid communication, said method comprising the steps of:

circulating fluid through the recirculating loop such that fuel is heated prior to being injected into the gas turbine engine;

circulating fluid through at least one heat exchanger that includes a tortuous flow path defined by and between a plurality of closely-spaced tubes such that a Reynolds number of the fluid entering the heat exchanger is increased within the heat exchanger for reducing fuel gum deposit formation within at least of the heat exchangers as the engine is operated;

passing air through at least one of the heat exchangers to cool fluid circulating within the recirculating loop; and passing air through at least one of the heat exchangers to cool the air prior to the air being directing to the gas turbine engine wherein at least one heat exchanger is mounted to an internal surface of an engine fan bypass casing, and at least one heat exchanger is mounted to an external surface of the engine core casing.

2. A method in accordance with claim 1 wherein said step of passing air through at least one of the plurality of heat exchangers to cool the air further comprising the step of passing air through an air-fluid heat exchanger to cool air supplied to the turbine.

3. A method in accordance with claim 1 wherein, said step of circulating fluid further comprising the step of passing fuel through a fluid-fuel heat exchanger to cool fluid circulating within the recirculating loop and heat fuel supplied to a combustor disposed within the gas turbine engine.

4. A method in accordance with claim 1 wherein gas turbine engine includes an engine fan bypass casing, said step of circulating fluid through the recirculating loop further comprising the steps of:

circulating fluid through the at least one heat exchanger mounted internally to the engine fan bypass casing; and circulating fluid through the at least one heat exchanger mounted externally to the engine core casing.

5. A method in accordance with claim 1 wherein said step of circulating fluid further comprising the step of controlling a temperature of fuel injected into the gas turbine engine by bypassing at least one the heat exchangers.

6. A cooling system for a gas turbine engine that includes an engine core casing, said cooling system comprising a recirculating loop comprising at least three heat exchangers in fluid communication, at least one of said heat exchangers includes a tortuous flow path defined by and between a plurality of closely-spaced tubes such that such that a Reynolds number of fluid entering said heat exchanger is increased within said heat exchanger prior to being discharged within said cooling system to facilitate reducing fuel gum deposit formation within said heat exchangers when fuel is supplied to the gas turbine engine during operation, wherein at least one heat exchanger is mounted to an internal surface of an engine fan bypass casing, and at least one heat exchanger is mounted to an external surface of the engine core casing.

7. A cooling system in accordance with claim 6 wherein said at least three heat exchangers comprise a first heat exchanger, a second heat exchanger, and a third heat exchanger, said first heat exchanger is an air-fluid heat exchanger, said second heat exchanger is an air-fluid heat exchanger, said third heat exchanger is a fluid-fuel heat exchanger.

8. A cooling system in accordance with claim 7 wherein the gas turbine engine includes a fan bypass casing having an external surface, said first heat exchanger mounted to the engine core casing external surface, said third heat exchanger mounted to the gas turbine engine fan bypass casing external surface.

9. A cooling system in accordance with claim 7 wherein a water and methanol mixture is circulated within said recirculating loop.

10. A cooling system in accordance with claim 7 wherein said recirculating loop further comprises a pressurizing accumulator configured to derive thermal energy from said recirculating loop for pressurization.

11. A cooling system in accordance with claim 7 wherein said recirculating loop further comprises a variable-speed recirculation pump.

12. A cooling system in accordance with claim 7 wherein said recirculating loop is selectively operable during gas turbine engine operations.

13. A cooling system in accordance with claim 7 wherein said third heat exchanger comprises a first passageway and a second passageway, said first passageway configured to permit fluid to flow from said second heat exchanger through said third heat exchanger, said second passageway configured to permit fuel to flow around said first passageway into the gas turbine engine.

14. A gas turbine engine comprising:

a combustor for igniting fuel supplied to said gas turbine engine;

a compressor;

an engine core casing extending circumferentially around said compressor;

a turbine located downstream from and in flow communication with said combustor and said compressor; and a cooling system in flow communication with said combustor, said compressor, and said turbine, said cooling system comprising a recirculating loop comprising at least three heat exchangers in fluid communication, at least one of said heat exchangers includes a tortuous flow path defined by and between a plurality of closely-spaced tubes such that such that a Reynolds number of fluid entering said heat exchanger is increased within said heat exchanger prior to being discharged within said cooling system to facilitate reducing fuel gum deposit formation within at least one of said three heat exchangers when the gas turbine engine is operating, wherein at least one heat exchanger is mounted to an internal surface of an engine fan bypass casing, and at least one heat exchanger is mounted to an external surface of said engine core casing.

15. A gas turbine engine in accordance with claim 14 wherein said cooling system at least three heat exchangers comprise a first heat exchanger, a second heat exchanger, and a third heat exchanger, said first heat exchanger in flow communication with said turbine, said third heat exchanger in flow communication with said combustor.

16. A gas turbine engine in accordance with claim 15 wherein said first heat exchanger is an air-fluid heat exchanger configured to cool air supplied to said turbine, said second heat exchanger is an air-fluid heat exchanger configured to cool fluid exiting said first heat exchanger and circulated to said third heat exchanger, said third heat exchanger is a fluid-fuel heat exchanger configured to cool fluid circulating in said recirculating loop and heat fuel supplied to said combustor.

17. A gas turbine engine in accordance with claim 15 wherein said cooling system recirculating loop further comprises a variable-speed recirculation pump.

18. A gas turbine engine in accordance with claim 15 wherein said cooling system recirculating loop further comprises a pressurizing accumulator configured to derive thermal energy from said recirculating loop to pressurize.

19. A gas turbine engine in accordance with claim 14 wherein a water and methanol mixture is circulated within said recirculating loop.

20. A gas turbine engine in accordance with claim 14 wherein said recirculating loop is selectively operable during gas turbine engine operations.

* * * * *

UNITED STATES PATENT AND TRADEMARK OFFICE
CERTIFICATE OF CORRECTION

PATENT NO. : 6,584,778 B1  Page 1 of 1
DATED : July 1, 2003
INVENTOR(S) : James Alan Griffiths et al.

It is certified that error appears in the above-identified patent and that said Letters Patent is hereby corrected as shown below:

<u>Column 7,</u>
Line 35, delete "at least of" insert therefor -- at least one of --.
Line 40, delete "directing" insert therefor -- directed --.
Line 41, after "engine" insert a comma -- , --.
Line 51, delete "wherein," insert therefor -- wherein --.
Line 56, delete "wherein gas" insert therefor -- wherein the gas --.
Line 67, delete "one the" insert therefor -- one of the --.

<u>Column 8,</u>
Lines 6 and 64, delete "such that such that" insert therefor -- such that --.

Signed and Sealed this

Seventh Day of October, 2003

JAMES E. ROGAN
*Director of the United States Patent and Trademark Office*